United States Patent
Na et al.

(10) Patent No.: US 11,337,102 B2
(45) Date of Patent: *May 17, 2022

(54) BASE STATION, AND QOS CONTROL METHOD OF WIRELESS SECTION

(71) Applicant: SK TELECOM CO., LTD., Seoul (KR)

(72) Inventors: Min Soo Na, Seoul (KR); Chang Soon Choi, Seoul (KR)

(73) Assignee: SK Telecom Co., Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/474,317

(22) PCT Filed: Apr. 4, 2018

(86) PCT No.: PCT/KR2018/003974
§ 371 (c)(1),
(2) Date: Jun. 27, 2019

(87) PCT Pub. No.: WO2019/022342
PCT Pub. Date: Jan. 31, 2019

(65) Prior Publication Data
US 2019/0342784 A1 Nov. 7, 2019

(30) Foreign Application Priority Data

Jul. 26, 2017 (KR) .................. 10-2017-0094896

(51) Int. Cl.
*H04W 28/02* (2009.01)
*H04W 28/10* (2009.01)
(Continued)

(52) U.S. Cl.
CPC ....... *H04W 28/0236* (2013.01); *H04W 28/02* (2013.01); *H04W 28/0257* (2013.01);
(Continued)

(58) Field of Classification Search
CPC ......... H04W 28/0236; H04W 28/0268; H04W 28/02; H04W 28/0257; H04W 28/0263;
(Continued)

(56) References Cited

U.S. PATENT DOCUMENTS

2009/0279430 A1* 11/2009 Huber ............... H04W 72/1226
370/230.1
2010/0103863 A1* 4/2010 Ulupinar ........... H04W 36/0072
370/315
(Continued)

FOREIGN PATENT DOCUMENTS

CN 104737613 A 6/2015
CN 105379351 A 3/2016
(Continued)

OTHER PUBLICATIONS

International Search Report dated Aug. 31, 2018 issued in Application No. PCT/KR2018/003974.
(Continued)

*Primary Examiner* — Kevin C. Harper
*Assistant Examiner* — Derrick V Rose
(74) *Attorney, Agent, or Firm* — KED & Associates LLP

(57) ABSTRACT

Disclosed is technology for applying a more differential QoS, that is, service quality to each communication service by implementing a differential QoS control in a radio section more precisely without any increase in complexity and load compared to a conventional bearer based QoS control method.

11 Claims, 9 Drawing Sheets

(51) Int. Cl.
 *H04W 88/08* (2009.01)
 *H04W 36/00* (2009.01)
(52) U.S. Cl.
 CPC ... *H04W 28/0263* (2013.01); *H04W 28/0268* (2013.01); *H04W 28/10* (2013.01); *H04W 36/0044* (2013.01); *H04W 88/08* (2013.01)
(58) Field of Classification Search
 CPC .. H04W 28/10; H04W 88/08; H04W 36/0044
 See application file for complete search history.

(56) References Cited

U.S. PATENT DOCUMENTS

| | | | | |
|---|---|---|---|---|
| 2011/0058523 | A1* | 3/2011 | Manning | H04W 28/16 |
| | | | | 370/329 |
| 2014/0341017 | A1 | 11/2014 | Mutikainen et al. | |
| 2015/0003435 | A1 | 1/2015 | Horn et al. | |
| 2015/0110044 | A1* | 4/2015 | Berzin | H04W 28/0252 |
| | | | | 370/329 |
| 2015/0229970 | A1 | 8/2015 | Ma et al. | |
| 2015/0230267 | A1 | 8/2015 | Lee et al. | |
| 2016/0050653 | A1* | 2/2016 | Rastogi | H04W 72/0486 |
| | | | | 455/453 |
| 2016/0269945 | A1 | 9/2016 | Jang et al. | |
| 2016/0338102 | A1* | 11/2016 | Nuggehalli | H04W 72/10 |
| 2017/0019816 | A1 | 1/2017 | Yuan | |
| 2017/0215122 | A1 | 7/2017 | Nigam et al. | |
| 2018/0192426 | A1* | 7/2018 | Ryoo | H04W 72/085 |
| 2019/0029057 | A1* | 1/2019 | Pan | H04W 28/12 |
| 2019/0230682 | A1* | 7/2019 | Tang | H04W 72/1231 |
| 2019/0253918 | A1* | 8/2019 | Liu | H04W 40/06 |
| 2019/0261211 | A1* | 8/2019 | Wu | H04W 76/20 |
| 2019/0297634 | A1* | 9/2019 | Dai | H04W 28/0268 |

FOREIGN PATENT DOCUMENTS

| | | |
|---|---|---|
| CN | 105979601 A | 9/2016 |
| KR | 10-2005-0089627 | 9/2005 |
| KR | 10-2008-0098302 | 11/2008 |
| KR | 10-0909105 | 7/2009 |
| KR | 10-2010-0072200 | 6/2010 |
| KR | 10-2014-0053346 | 5/2014 |
| KR | 10-2014-0093167 | 7/2014 |
| WO | WO 2015/149271 | 10/2015 |
| WO | WO 2016/163808 | 10/2016 |
| WO | WO 2018/074703 | 4/2018 |

OTHER PUBLICATIONS

Korean Office Action dated Dec. 10, 2018 issued in Application No. 10-2017-0094896.
Chinese Office Action dated Dec. 23, 2021 issued in Application 201880005487.9.
3GPP TSG-RAN WG2 Meeting #95, Gothenburg, Sweden, Aug. 22-26, 2016; Agenda Item 9.4.2.2.

* cited by examiner

BASE STATION, AND QOS CONTROL METHOD OF WIRELESS SECTION

CROSS-REFERENCE TO RELATED PATENT APPLICATIONS

This application is a U.S. National Stage Application under 35 U.S.C. § 371 of PCT Application No. PCT/KR2018/003974, filed Apr. 4, 2018, which claims priority to Korean Patent Application No. 10-2017-0094896, filed Jul. 26, 2017, whose entire disclosures are hereby incorporated by reference.

BACKGROUND OF THE INVENTION

1. Field of the Invention

The present disclosure relates to a QoS control technology for transmitting packet of a communication service at different QoS levels.

More particularly, the present disclosure relates to a technology for implementing differential QoS control in a radio section more precisely without any increase in complexity and load compared to a conventional bearer based QoS control method.

2. Description of the Prior Art

In a mobile communication system, a Quality of Service (QoS) level varies depending on a media type of a communication service used by a terminal (user). The mobile communication system provides QoS control for transmitting a packet of a communication service with a QoS level suitable for a media type.

A QoS control method provided by an LTE network is an EPS bearer based QoS control method (hereinafter, a bearer based QoS control method).

In order to use a communication service in the LTE network, the terminal (user) generates an EPS bearer (hereinafter, called a bearer) for transmitting data. The EPS bearer, that is, the bearer may be a tunnel generated from a terminal to a P-GW including a radio section for connecting the terminal and a Base Station (BS) and a wired section for connecting the BS, an S-GW and the P-GW.

Data of the user (terminal) is transmitted in the form of an IP-based packet through the tunnel, that is, the bearer, and a traffic flow according to packet transmission is referred to as a service flow.

Conventionally, since communication service types provided to terminals (users) were relatively limited, the bearer based QoS control method was used where several types of communication services are grouped and the QoS is guaranteed (applied) on the logical basis of "bearer".

Accordingly, service flows transmitted through one bearer are all transmitted with the same QoS (QoS level of the bearer) since the conventional bearer based QoS control method defines a QoS level (QoS parameter) for each bearer and guarantees the QoS on the basis of bearer.

As a result, the conventional bearer based QoS control method has an advantage in that complexity of the QoS control can be reduced but has a limit in that differential QoS cannot be applied to each service flow belonging to one bearer.

As described above, the limit of the conventional bearer based QoS control method is not a big problem in a situation in which types of communication services are relatively limited.

However, in a current or future situation (for example, 5G) in which various types of communication services are developed/introduced rapidly, it is required to improve the limit of the conventional bearer based QoS control method.

Therefore, the present disclosure proposes a method of implementing the differential QoS control in a radio section more precisely without any increase in complexity and load compared to the conventional bearer based QoS control method.

SUMMARY OF THE INVENTION

An aspect of the present disclosure is to implement the differential QoS control in a radio section more precisely without any increase in complexity and load compared to the conventional bearer based QoS control method.

In accordance with an aspect of the present disclosure, a method of controlling a QoS of a radio section includes: identifying, by a Base Station (BS) apparatus, dedicated radio section QoS parameter mapped to QoS parameter, the QoS parameter being applied to service flow of packet; and transmitting, by the BS apparatus, the packet in the radio section by applying the identified dedicated radio section QoS parameter.

Specifically, the method may further comprise: storing, by the BS apparatus, a mapping table in which dedicated radio section QoS parameter is mapped to each QoS parameter applied a service flow by a core network, wherein the number of dedicated radio section QoS parameter is larger than the number of QoS parameter in the mapping table.

Specifically, the method may further comprise: storing, by the BS apparatus, a mapping table in which dedicated radio section QoS parameter is mapped to each QoS parameter applied a service flow by a core network, wherein two or more different QoS parameters are mapped to one dedicated radio section QoS parameter in the mapping table.

Specifically, the two or more QoS parameters may be QoS parameters which the core network applies to a communication service for periodically transmitting a small data equal to or lower than a particular size or an Internet of Things (IoT) service.

Specifically, the method may further comprise: storing, by the BS apparatus, a mapping table in which dedicated radio section QoS parameter is mapped to each QoS parameter applied a service flow by a core network, wherein, when a particular QoS parameter is applied to one service flow, a dedicated radio section QoS parameter is mapped to each QoS of content included in the service flow in the mapping table.

Specifically, the particular QoS parameter may be a QoS parameter having a service type of a Non-GBR which does not guarantee a bandwidth.

Specifically, the identifying comprises: identifying QoS of content by identifying a DSCP field for indicating a service quality type (DiffServ) in a header of the packet when a QoS parameter applied to the service flow is the particular QoS parameter, and identifying a dedicated radio section QoS parameter mapped to the identified QoS of content in the mapping table.

According to embodiments of the present disclosure, it is possible to implement the different QoS control in the radio section more precisely without any increase in complexity and load compared to the conventional bearer based QoS control method.

Therefore, various embodiments of the present disclosure derive an effect of applying more differential QoS, that is, a variety of service quality to each communication service by implementing the differential QoS control in the radio section more precisely.

DETAILED DESCRIPTION OF THE EXEMPLARY EMBODIMENTS

Hereinafter, embodiments of the present disclosure will be described with reference to the accompanying drawings.

Prior to a detailed description of the present disclosure, the conventional bearer based QoS control method will be described with reference to FIG. 1.

The conventional bearer based QoS control method is a method of grouping several types of communication services and applying (guaranteeing) a QoS on the logical basis of "bearer".

Figure 1:
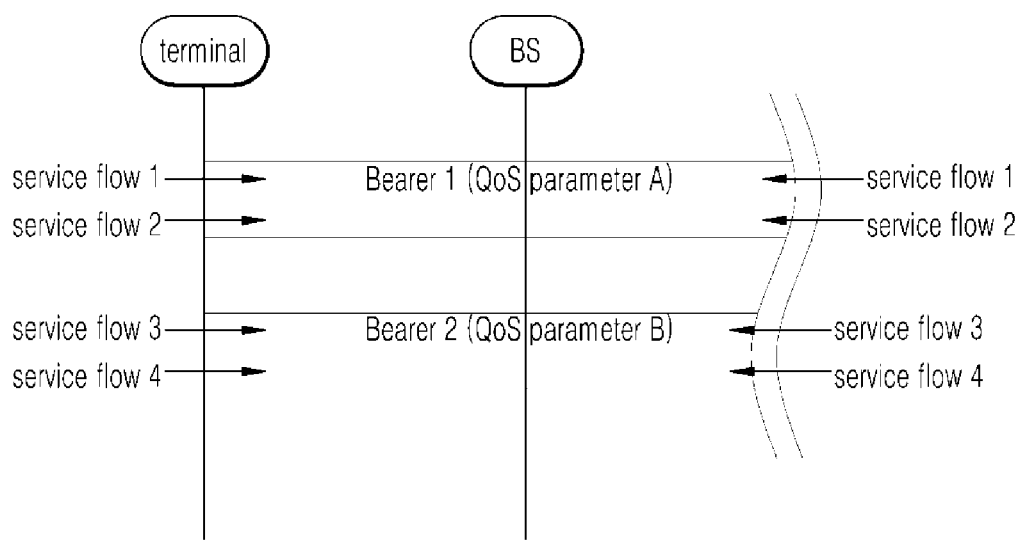
FIG. 1 illustrates an example of a conventional bearer based QoS control method.

As illustrated in FIG. 1, in order to use a communication service, a terminal (user) generates EPS bearers (hereinafter, referred to as bearers), that is, bearers 1 and 2 for guaranteeing QoS required by the communication service which the terminal (user) desires to use.

Each of bearers 1 and 2 may be a default bearer or a dedicated bearer.

In FIG. 1, it is assumed that service flow 1 of communication service 1 and service flow 2 of communication service 2 used by the terminal belong to one bearer (bearer 1), and service flow 3 of communication service 3 and service flow 4 of communication service 4 used by the terminal belong to one bearer (bearer 2).

Under such an assumption, as illustrated in FIG. 1, the same QoS, that is, a QoS level (QoS parameter A) of bearer 1 is applied to both service flows 1 and 2 transmitted through bearer 1, and the same QoS, that is, a QoS level (QoS parameter B) of bearer 2 is applied to both service flows 3 and 4 transmitted through bearer 2.

As a result, the conventional bearer based QoS control method has an advantage in that complexity in the QoS control can be reduced through application of the QoS on the logical basis of bearer, but has a limit in that differential QoS cannot be applied to each service flow belonging to one bearer.

Accordingly, the present disclosure proposes a method of realizing the differential QoS control more precisely than the conventional bearer based QoS control method. Particularly, the present disclosure is to realize the method in a radio section which may be a core of the QoS control.

However, when the differential QoS control is realized more precisely, complexity and load of the QoS control may increase compared to the conventional bearer based QoS control method.

Accordingly, the present disclosure proposes a method (hereinafter, referred to as a radio section QoS control method) of minimizing an increase in complexity and load compared to the conventional bearer based QoS control method and implementing the differential QoS control in a radio section more precisely.

Hereinafter, an apparatus, that is, a BS apparatus for implementing the radio section QoS control method proposed by the present disclosure will be described in detail.

First, the flow of the radio section QoS control method according to an embodiment of the present disclosure is described with reference to FIG. 2.

A core network 20 transfers a mapping rule for converting a QoS parameter, which the core network 20 applies to a service flow, into a dedicated radio section QoS parameter to a BS 100 in S1.

At this time, the core network 20 may support the conventional bearer based QoS control method.

In this case, the QoS parameter which the core network 20 applies to the service flow may be the same as a QoS parameter (QoS level) of a bearer to which the corresponding service flow belongs.

Accordingly, when the core network 20 supports the conventional bearer based QoS control method, the mapping rule may be for converting a QoS parameter into a dedicated radio section QoS parameter with respect to each QoS parameter (each bearer based QoS parameter) applied to a service flow.

Further, the core network 20 may support a service flow based QoS control method that guarantees (applies) a different QoS for each service flow unlike the conventional bearer based QoS control method.

In this case, the QoS parameter which the core network 20 applies to the service flow may be a QoS parameter (QoS level) defined for each service flow.

Accordingly, when the core network 20 supports the service flow based QoS control method, the mapping rule may be a mapping rule for converting a QoS parameter into a dedicated radio section QoS parameter with respect to each QoS parameter (each service flow based QoS parameter) applied to a service flow.

However, the radio section QoS control method proposed by the present disclosure may obtain the same effect described below through the same configuration described below regardless of whether the core network 20 supports the bearer based QoS control method or the service flow based QoS control method.

Accordingly, the following description of the present disclosure will be made without distinction about whether the core network 20 supports the bearer based QoS control method or the service flow based QoS control method for convenience of description.

The BS 100 may set a mapping rule transferred from the core network 20 in S2.

At this time, information on the mapping rule set by and stored in the BS 100 may have a form of a mapping table in which a dedicated radio section QoS parameter is mapped to each QoS parameter (bearer based QoS parameter or service flow based QoS parameter) applied to the service flow by the core network 20.

The BS 100 inserts QoS control information into an RRC message and provides the RRC message to the terminal 10 in a Radio Resource Control (RRC) setup process (S3) with the terminal 10 accessing the BS 100.

The QoS control information is information for allowing the terminal 10 to identify a dedicated radio section QoS parameter which the BS 100 applies to each service flow.

For example, QoS control information may include a dedicated radio section QoS parameter applied to a service flow which the BS 100 provides to the terminal 10.

Accordingly, the terminal 10 may set the QoS control information provided from the BS 100 in S4.

When the BS 100 receives a packet to be transmitted to the terminal 10 from the core network 20 in S5, the BS 100 identifies a QoS parameter (for example, QoS parameter A) applied to a service flow of this packet.

Further, the BS 100 identifies a dedicated radio section QoS parameter mapped to the QoS parameter applied to the service flow in the set/stored mapping table in S6.

That is, the BS 100 converts a QoS level of the core network 20 into a dedicated radio section QoS level by mapping the QoS parameter (for example, QoS parameter A), which the core network 20 applies to this packet (service flow), to the dedicated radio section QoS parameter (for example, QoS parameter 1) in S6.

Thereafter, before transmission of this packet to the terminal 10, the BS 100 applies the identified dedicated radio section QoS parameter (for example, QoS parameter 1) to the packet and transmits the packet in S7.

That is, the BS 100 converts the QoS level which the core network 20 applies into the dedicated radio section QoS level and transmits this packet.

When an uplink packet is generated in S8, the terminal 10 may equally apply the dedicated radio section QoS parameter (for example, QoS parameter 1) on the basis of preset QoS control information, which the BS 100 applies in downlink of this service flow, and transmit the uplink packet in S9.

As described above, the terminal 10 may transmit the uplink packet at the dedicated radio section QoS level which is the same as that in the downlink on the basis of the preset QoS control information.

Upon receiving the uplink packet form the terminal 10, the BS 100 inversely performs QoS mapping of step S6 to convert the dedicated radio section QoS level into the QoS level of the core network 20 and transmit this uplink packet in S10.

That is, upon receiving the uplink packet from the terminal 10, the BS 100 map the dedicated radio section QoS parameter (for example, QoS parameter 1) to the QoS parameter (for example, QoS parameter A) which the core network 20 applies and then applies the QoS parameter (for example, QoS parameter A) to transmit the uplink packet in S10.

Hereinafter, the apparatus, that is, the BS apparatus for implementing the radio section QoS control method according to an embodiment of the present disclosure will be described in detail with reference to FIG. 3.

Figure 2:
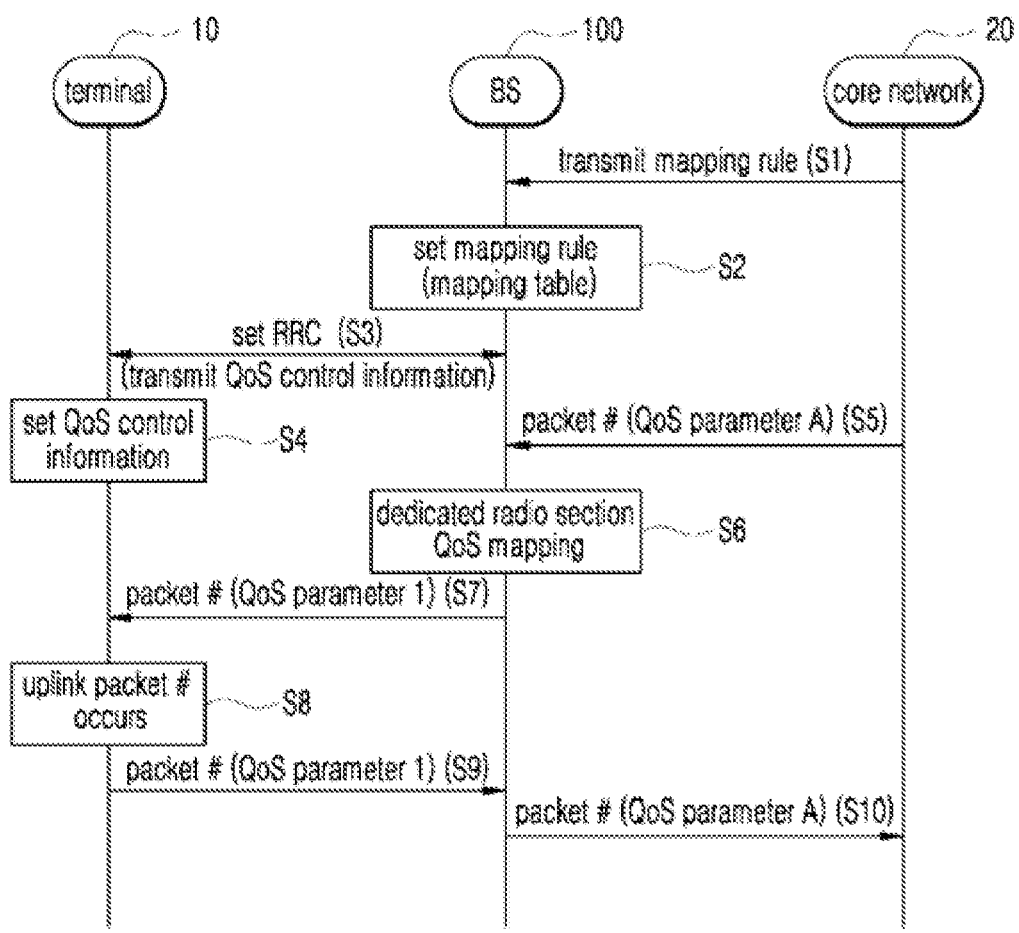
FIG. 2 illustrates an example of flow for implementing a radio section QoS control method according to an embodiment of the present disclosure.

For convenience of description, the reference numeral of the BS 100 in FIG. 2 will be equally used.

Figure 3:
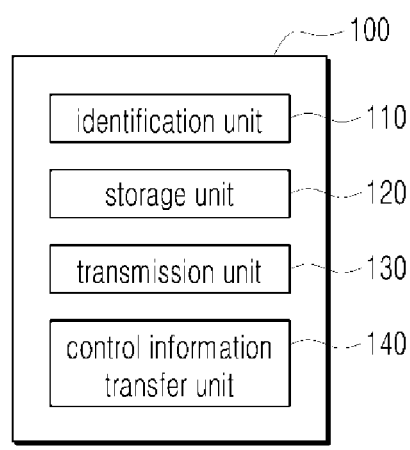
FIG. 3 is a block diagram illustrating the configuration of a BS apparatus according to an embodiment of the present disclosure.

As illustrated in FIG. 3, the BS apparatus 100 according to the present disclosure includes an identification unit 110 and a transmission unit 130.

With respect to a packet to be transmitted to the terminal, the identification unit 110 performs, on the basis of a QoS parameter applied to a service flow, a function of identifying a dedicated radio section QoS parameter mapped to the QoS parameter.

The transmission unit 130 performs a function of converting the QoS level which the core network applies into the dedicated radio section QoS level and transmitting a packet by applying the dedicated radio section QoS parameter identified by the identification unit 110.

Here, the terminal is a terminal accessing the BS apparatus 100 and using a communication service and may simultaneously use a plurality of communication services through the BS apparatus 100.

The following description will be made based on the terminal 10 illustrated in FIG. 2.

Upon receiving the packet to be transmitted to the terminal 10 from the core network 20, the identification unit 110 identifies the QoS parameter applied to the service flow of the corresponding packet.

For example, a header of the downlink packet received from the core network 20 may include the QoS parameter which the core network 20 applies to the service flow of the corresponding packet.

In this case, the identification unit 110 may extract/identify the QoS parameter included in the header of the packet to be transmitted to the terminal 10 so as to identify the QoS parameter applied to the service flow of the packet.

Alternatively, the header of the downlink packet received from the core network 20 may include a separate QoS identifier for identifying the QoS parameter, which the core network 20 applies to the service flow of the corresponding packet.

In this case, the identification unit 110 may extract/identify the QoS parameter included in the header of the packet to be transmitted to the terminal 10 so as to identify the QoS parameter applied to the service flow of the packet.

Alternatively, the BS apparatus 100 may store policy information indicating which QoS parameter (the bearer based QoS parameter or the service flow based QoS parameter) will be applied to each service flow by the core network 20.

In this case, the identification unit 110 may identify the service flow of the packet on the basis of 5-tuple, that is, a source IP, a destination IP, a source Port, a destination Port, and a protocol ID within the header of the packet to be transmitted to the terminal 10 and identify the QoS parameter which the core network 20 will apply to the identified service flow on the basis of the policy information so as to identify the QoS parameter applied by the core network 20 to the service flow of the packet.

In addition, when the QoS parameter applied to the service flow of the packet is identified, the identification unit 110 identifies a dedicated radio section QoS parameter mapped to the QoS parameter.

To this end, the BS apparatus 100 may further include a storage unit 120 configured to store a mapping table in which the dedicated radio section QoS parameter is mapped to each QoS parameter which the core network 20 applies to the service flow.

More specifically, a predetermined specific device (not shown) within the core network 20 transfers, to the BS apparatus 100, a mapping rule for converting the QoS parameter applied to the service flow into the dedicated radio section QoS parameter.

At this time, the core network 20 may directly support the conventional bearer based QoS control method.

In this case, the QoS parameter which the core network 20 applies to the service flow may be the same as a QoS parameter (QoS level) of a bearer to which the corresponding service flow belongs.

Accordingly, when the core network 20 supports the conventional bearer based QoS control method, with respect to each QoS parameter (each bearer based QoS parameter) applied to a service flow, the mapping rule may be a mapping rule for converting a QoS parameter into a dedicated radio section QoS parameter.

Further, the core network 20 may support a service flow based QoS control method that guarantees (applies) a different QoS for each service flow unlike the conventional bearer based QoS control method.

In this case, the QoS parameter which the core network 20 applies to the service flow may be a QoS parameter (QoS level) defined for each service flow.

Accordingly, when the core network 20 supports the service flow based QoS control method, with respect to each QoS parameter (each service flow based QoS parameter) applied to a service flow, the mapping rule may be a mapping rule for converting a QoS parameter into a dedicated radio section QoS parameter.

However, the radio section QoS control method proposed by the present disclosure may obtain the same effect described below through the same configuration described below regardless of whether the core network 20 supports the bearer based QoS control method or the service flow based QoS control method.

For convenience of description, the following description will be made without distinction about whether the core network 20 supports the bearer based QoS control method or the service flow based QoS control method.

The BS apparatus 100 sets the mapping rule transferred from the core network 20, and the storage unit 120 stores a mapping table in which the dedicated radio section QoS parameter is mapped to each QoS parameter (the bearer based QoS parameter or the service flow based QoS parameter), which the core network 20 applies to the service flow in a process of setting the mapping rule.

When the QoS parameter applied to the service flow of the packet is identified, the identification unit 110 identifies the dedicated radio section QoS parameter mapped to the QoS parameter in the mapping table stored in the storage unit 120.

That is, the identification unit 110 converts a QoS level on the core network 20 into a dedicated radio section QoS level by mapping the QoS parameter which the core network 20 applies to this packet (service flow) to the dedicated radio section QoS parameter.

The transmission unit 130 applies the dedicated radio section QoS parameter identified by the identification unit 110 to transmit this packet to the terminal 10 and converts the QoS level which the core network 20 applies into the dedicated radio section QoS level to transmit this packet.

That is, when transmitting a downlink packet through a radio section, the transmission unit 130 applies the dedicated radio section QoS parameter (QoS level) instead of the QoS parameter (QoS level) which the core network 20 applies to the service flow of the corresponding packet to transmit the downlink packet.

As described above, the present disclosure may separately implement the QoS control of the radio section between the terminal and the access end (BS) regardless of the QoS control method between the access end and the core network among all sections from the terminal to the core network, which is unlike the conventional QoS control method of applying the QoS to all sections (bearers) from the terminal to the core network.

That is, in the radio section QoS control method according to the present disclosure, a most sensitive radio section which can be a core of the QoS control among all sections from the terminal to the core network is defined on the basis of a Data Radio Bearer (DRB) and thus the differential QoS control may be independently implemented in the radio section on the basis of DRB.

The radio section QoS control method according to the present disclosure has been described based on downlink traffic.

In order to apply the radio section QoS control method according to the present disclosure to uplink traffic, a process of providing information (QoS control information) required for the radio section QoS control to the terminal is needed. But the process may increase complexity and load as the QoS control is performed more precisely.

Accordingly, in the present disclosure, the information (QoS control information) required for the radio section QoS control should be provided to the terminal while the increase in complexity and load is minimized.

Specifically, as illustrated in FIG. 3, the BS apparatus 100 according to the present disclosure further includes a control information transfer unit 140.

The control information transfer unit 140 transmits an RRC message including QoS control information for identifying the dedicated radio section QoS parameter identified by the identification unit 110 to the terminal 10.

More specifically, when the terminal 10 accesses the BS apparatus 100 to use a communication service, a Radio Resource Control (RRC) setup process is performed between the BS apparatus 100 and the terminal 10.

At this time, the control information transfer unit 140 inserts QoS control information into the RRC message during the RRC setup process and provides the RRC message to the terminal 10.

The QoS control information is information for allowing the terminal 10 to identify the dedicated radio section QoS parameter which the BS apparatus 100 applies to each service flow.

For example, the QoS control information may include a dedicated radio section QoS parameter applied to a service flow which the BS apparatus 100 provides to the terminal 10.

More specifically, the QoS control information may be information for identifying the dedicated radio section QoS parameter which the BS apparatus 100 applies to each service flow, the information having a form in which 5-tuple (a source IP, a destination IP, a source port, a destination port, and a protocol ID) used for distinguishing service flows and dedicated radio section QoS parameters are mapped.

The terminal 10 may set QoS control information provided from the BS apparatus 100 and thus know information (QoS control information) required for the radio section QoS control.

The terminal 10 may apply the dedicated radio section QoS parameter which is the same as that which the BS apparatus 100 applies in the downlink of this service flow on the basis of the QoS control information to transmit an uplink packet.

That is, the terminal 10 may transmit the uplink packet at the dedicated radio section QoS level which is the same as that of the downlink on the basis of the set QoS control information provided from the BS apparatus 100.

As described above, in the present disclosure, it is possible to minimize an increase in complexity and load through the use of only minimum messages and provide information (QoS control information) required for the radio section QoS control to the terminal by providing the QoS control information to the terminal in the RRC setup process.

Meanwhile, on the basis of the definition of a mapping rule (mapping table), the radio section QoS control method proposed by the present disclosure may obtain different performances through the QoS control in the radio section.

Hereinafter, in the radio section QoS control method, various embodiments according to the definition of the mapping rule (mapping table) for the QoS control will be described.

First, an ideal example for the most detailed and differential QoS control may be a 1:1 mapping table of service flow:DRB that can guarantee different dedicated radio section QoS levels (DRBs) for each service flow.

In the case of 1:1 mapping of service flow:DRB, since it is possible to guarantee an independent optimal dedicated radio section QoS level (DRB) for each service flow, the 1:1 mapping of service flow:DRB is the most excellent in the light of a differential QoS control for each service flow.

However, in the case of 1:1 mapping of service flow:DRB, there is a concern about a serious increase in complexity and load compared to the conventional QoS control method because of an overhead due to excessive mapping processing by the access end (BS) and costs due to management of a large number of DRBs.

Accordingly, the present disclosure proposes three embodiments below to define a mapping rule (mapping table) for the QoS control.

However, hereinafter, it is assumed that the core network 20 supports the service flow based QoS control method for convenience of description.

Based on such an assumption, a QoS parameter (QoS level) defined for each service flow may be applied to the service flow received by the core network 20.

According to an embodiment (hereinafter, referred to as a first embodiment) of the three embodiments, M:N mapping of service flow:DRB is proposed (M>N).

According to the first embodiment, in a mapping table, the number of dedicated radio section QoS parameters is larger than the number of QoS parameters.

That is, when it is assumed that the number of service flows received by the core network 20 is M, an M:N mapping rule (mapping table) of service flow:DRB is defined such that M QoS parameters (QoS levels) applied to M service flows, respectively, are mapped to N dedicated radio section QoS parameters (QoS levels) (M>N).

The M:N mapping of service flow:DRB has slightly lower performance than 1:1 mapping but has better performance than the conventional unit QoS control in the light of differential QoS control.

Further, the M:N mapping of service flow:DRB is more excellent than 1:1 mapping in the light of overhead due to mapping processing by the access end (BS) and costs due to DRB management, thereby reducing an increase in complexity and load.

At this time, the relation between M QoS parameters and N dedicated radio section QoS parameters may be determined when the mapping rule (mapping table) is defined.

Meanwhile, according to an embodiment (hereinafter, referred to as a second embodiment) of the three embodiments, M:1 mapping of service flow:DRB is proposed.

According to the second embodiment, in a mapping table, two different QoS parameters are mapped to the one same dedicated radio section QoS parameter.

That is, an M:1 mapping rule (mapping table) of service flow:DRB is defined such that M QoS parameters (QoS levels) applied to M service flows received by the core network 20, respectively, are mapped to one dedicated radio section QoS parameter (QoS level).

At this time, M QoS parameters (QoS levels) applied to M service flows may be QoS parameters (QoS levels) applied to a communication service or an Internet of Things (IoT) service in which the core network 20 periodically transmits a small amount of data equal to or lower than a particular size.

One of the communication services spotlighted in a 5G environment is a communication service, that is, an IoT service in which each of a plurality of remote terminals periodically transmits a small amount of data lower than a particular size, which is collected thereby, to the center (server).

In the IoT service, an IoT service of specific IoT technology (Long Range: LoRa) that supports low speed transmission (<1 kbps) and low power in wide coverage has appeared.

Since the IoT service is specialized in wide coverage/low speed transmission (<1 kbps)/low power/small amount of data, the IoT service puts a larger weight on efficient operation of radio resources compared to a differential QoS control for each service flow in the radio section.

In an embodiment of M:1 of service flow:DRB, M service flows of the IoT service are mapped to the one same dedicated radio section QoS parameter (QoS level) and thus the M:1 mapping is very excellent in the light of overhead due to mapping processing by the access end (BS) and costs due to DRB management and also efficiency in operation of radio resources is high, so that an increase in complexity and load can be reduced and the efficiency of operation of radio resources can be increased.

Meanwhile, according to an embodiment (hereinafter, referred to as a third embodiment) of the three embodiments, 1:N mapping of service flow:DRB is proposed.

According to the third embodiment, in a mapping table, to one service flow to which a particular QoS parameter is applied, dedicated radio section QoS parameters are mapped for each QoS of content included in the service flow.

That is, a 1:N mapping rule (mapping table) of service flow:DRB is defined such that one particular QoS parameter (QoS level) applied to one service flow received by the core network 20 is mapped to N dedicated radio section QoS parameters (QoS levels).

At this time, the particular QoS parameter has a service type of a Non-Guaranteed Bit Rate (GBR) that does not guarantee a bandwidth.

The QoS parameter applied by the core network 20 includes a service type (resource type), a QoS Class Identifier (QCI), and an Allocation and Retention Priority (ARP).

The service type is a parameter indicating a GBR that guarantees a bandwidth or a Non-GBR that does not guarantee a bandwidth in transmission.

The QCI is a parameter indicating a QoS priority through an integer from 1 to 9.

The ARP is a parameter involved in generation or rejection when a request for generating a bearer according to a service flow is made.

Of course, the QoS parameter may include other parameters as well as the above parameters.

Even one service flow, to which the QoS parameter of the non-GRB that does not guarantee the bandwidth is applied, may include packets of each piece of content having different QoS requirements.

In an embodiment of 1:N of service flow:DRB, with respect to one service flow to which a particular QoS parameter of the non-GBR is applied, different dedicated radio section QoS parameters are mapped for each piece of content (identified on the basis of a QoS requirement) included in the service flow, so that the radio section QoS control may be differentially applied in most detailed units.

Particularly, in the third embodiment of 1:N mapping, an element for distinguishing each piece of content (content QoS) included in the service flow is further needed.

Accordingly, in the third embodiment, upon receiving a packet to be transmitted to the terminal 10 from the core network 20, the identification unit 110 identifies a QoS parameter applied to the service flow of the corresponding packet to check whether the QoS parameter is a particular QoS parameter of the non-GBR.

When the QoS parameter is the particular QoS parameter of the non-GBR on the basis of the identification result of the QoS parameter, the identification unit 110 may identify a QoS (QoS requirement) of content on the basis of a Differentiated Services Code Point (DSCP) field for distinguishing a service quality type (DiffServ) in a header of this packet (for example, an IP packet header).

Further, in the mapping table (1:N mapping) according to the third embodiment, the identification unit 110 identifies a dedicated radio section QoS parameter mapped to the QoS (QoS requirement) of the identified content.

In this packet transmission to the terminal 10, the transmission unit 130 applies the dedicated radio section QoS parameter (the dedicated radio section QoS parameter for each piece of content identified on the basis of the QoS (QoS requirement) of content in one service flow) identified by the identification unit 110 and transmits this packet at a dedicated radio section QoS level (for each piece of content within the service flow) converted from the QoS level applied by the core network 20.

In the third embodiment (1:N), by mapping N different dedicated radio section QoS parameters (QoS levels) to each piece of content included in one service flow, the performance may be most excellent compared to the conventional QoS control methods (in a bearer basis or in a service flow basis) in the light of differential QoS control.

As described above, according to embodiments of the present disclosure, it is possible to independently realize the DRB based QoS control in the radio section by separately implementing the QoS control of the radio section between the terminal and the access end (BS) regardless of the QoS control method between the access end and the core network among all sections from the terminal to the core network.

Furthermore, according to embodiments of the present disclosure, through various embodiments defining the mapping rule (mapping table), it is possible to acquire the QoS control performance while minimizing an increase in complexity and load concerned due to the independent radio section QoS control and to expect an effect of increasing operation efficiency of radio resources.

According to the radio section QoS control method according to the present disclosure, it is possible to derive an effect of applying more differential QoS (quality of service) for each communication service by implementing the differential QoS control in the radio section more precisely without any increase in complexity and load compared to a conventional bearer based QoS control method.

Hereinafter, the radio section QoS control method according to various embodiments of the present disclosure will be described with reference to FIGS. 4 to 9.

However, the radio section QoS control method proposed by the present disclosure is implemented by the BS 100, and thus hereinafter will be referred to as a radio section QoS control method of the BS 100 for convenience of description.

First, the radio section QoS control method according to a first embodiment of the present disclosure will be described with reference to FIGS. 4 and 5.

Figure 4:
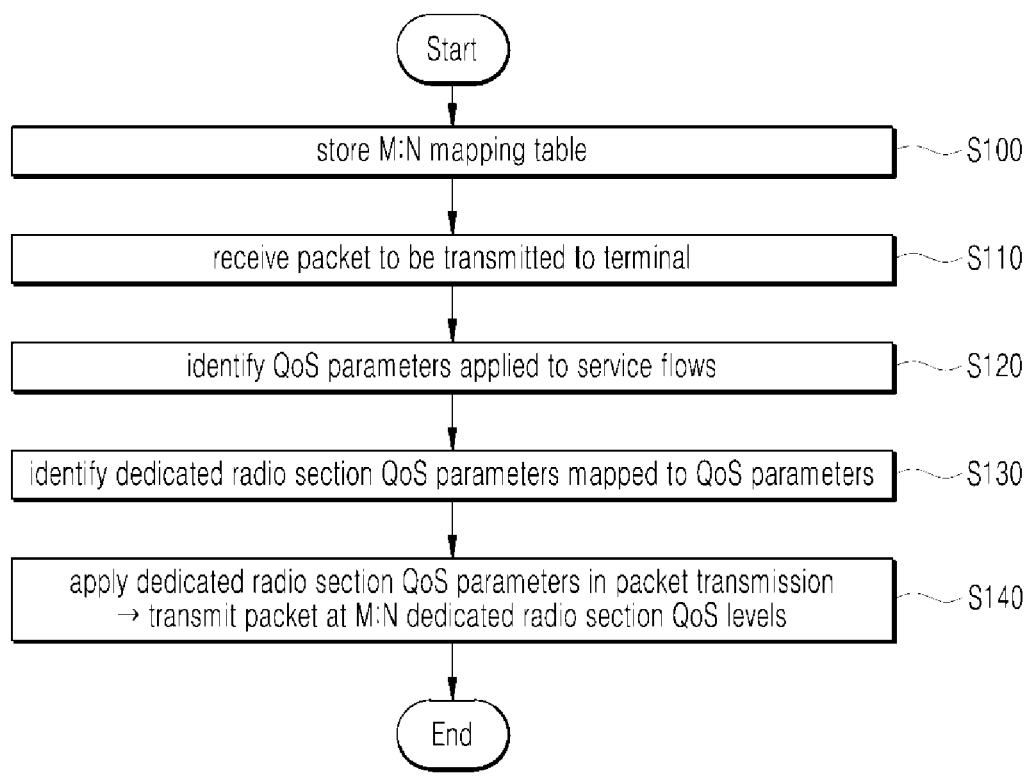
FIGS. 4 and 5 are control flowcharts illustrating a radio section QoS control method according to an embodiment of the present disclosure.

As illustrated in FIG. 4, in the radio section QoS control method according to the present disclosure, that is, the radio section QoS control method of the BS 100, a mapping table according to the first embodiment, that is, an M:N mapping table of service flow:DRB is stored in S100.

In the radio section QoS control method of the BS 100, when a packet to be transmitted to the terminal 10 is received in S110, QoS parameters applied to service flows of the corresponding packet, that is, QoS parameters applied by the core network 20 are identified in S120.

In the radio section QoS control method of the BS 100, when the QoS parameters are identified in S120, dedicated radio section QoS parameters mapped to the QoS parameters are identified in the M:N mapping table in S130.

In the radio section QoS control method of the BS 100, the dedicated radio section QoS parameters identified in S130 may be applied to transmit this packet the terminal 10 and this packet may be transmitted at a dedicated radio section QoS level converted from the QoS level applied by the core network 20 in S140.

Figure 5:
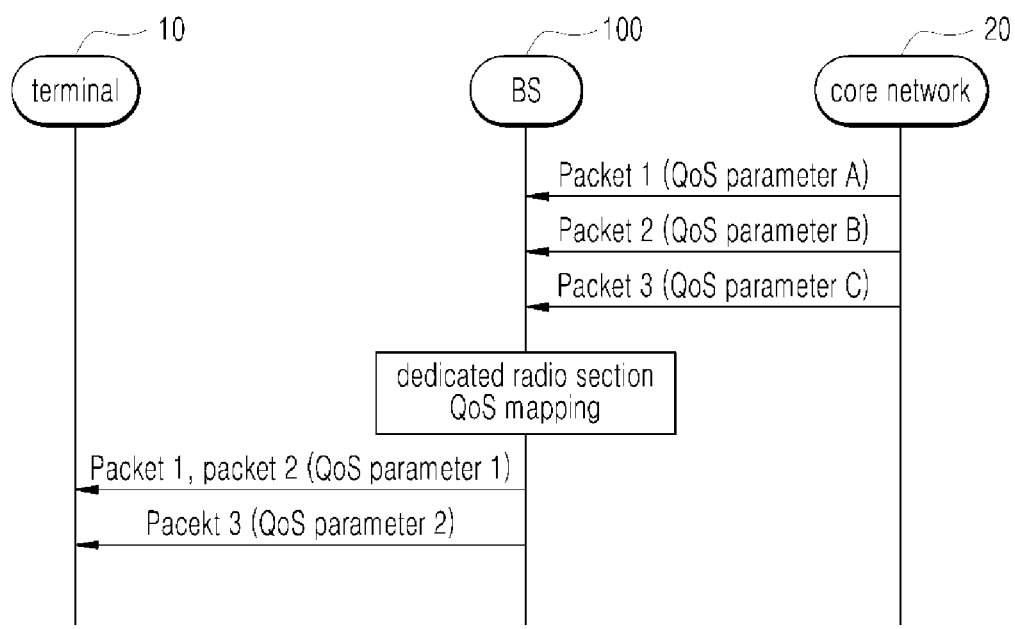

Referring to FIG. 5, it is assumed that packets of service flows 1, 2, and 3 to which different QoS parameters A, B, and C are applied are received.

In this case, after identifying QoS parameters A, B, and C applied to service flows of the respective packets 1, 2, and 3, the BS 100 identifies dedicated radio section QoS parameters mapped to QoS parameters A, B, and C in the M:N mapping table to perform dedicated radio section QoS mapping.

At this time, in the M:N mapping table, it is assumed that QoS parameters A and B are mapped to dedicated radio section QoS parameter 1, and QoS parameter C is mapped to dedicated radio section QoS parameter 2.

In this case, the BS 100 may apply dedicated radio section QoS parameter 1 in transmission of packets 1 and 2 to the terminal 10 and apply dedicated radio section QoS parameter 2 in transmission of packet 3 to the terminal 10, so as to transmit these packets 1, 2, and 3 at M:N radio section-dedicated QoS levels generated by converting the QoS levels applied by the end of the core network 20 into the dedicated radio section QoS levels.

Subsequently, the radio section QoS control method according to the second embodiment of the present disclosure will be described with reference to FIGS. 6 and 7.

Figure 6:
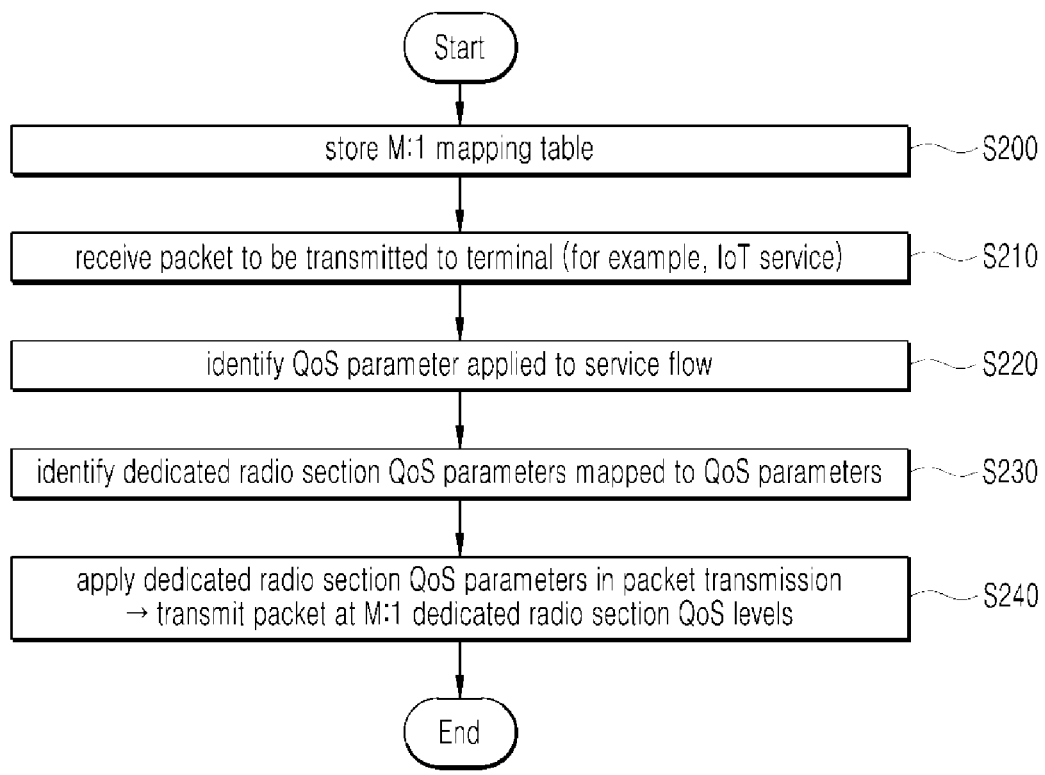
FIGS. 6 and 7 are control flowcharts illustrating a radio section QoS control method according to an embodiment of the present disclosure.

As illustrated in FIG. 6, in the radio section QoS control method of the BS 100 according to the present disclosure, a mapping table according to the second embodiment, that is, an M:1 mapping table of service flow:DRB is stored in S200.

In the radio section QoS control method of the BS 100, when a packet to be transmitted to the terminal 10 is received in S210, QoS parameters applied to service flows of the corresponding packet, that is, QoS parameters applied by the core network 20 are identified in S220.

In the radio section QoS control method of the BS 100, when the QoS parameters are identified in S220, dedicated radio section QoS parameters mapped to the QoS parameters are identified in the M:N mapping table in S230.

In the radio section QoS control method of the BS 100, the dedicated radio section QoS parameters identified in S230 may be applied to transmit this packet the terminal 10 and this packet may be transmitted at a dedicated radio section QoS level converted from the QoS level applied by the core network 20 in S240.

Figure 7:
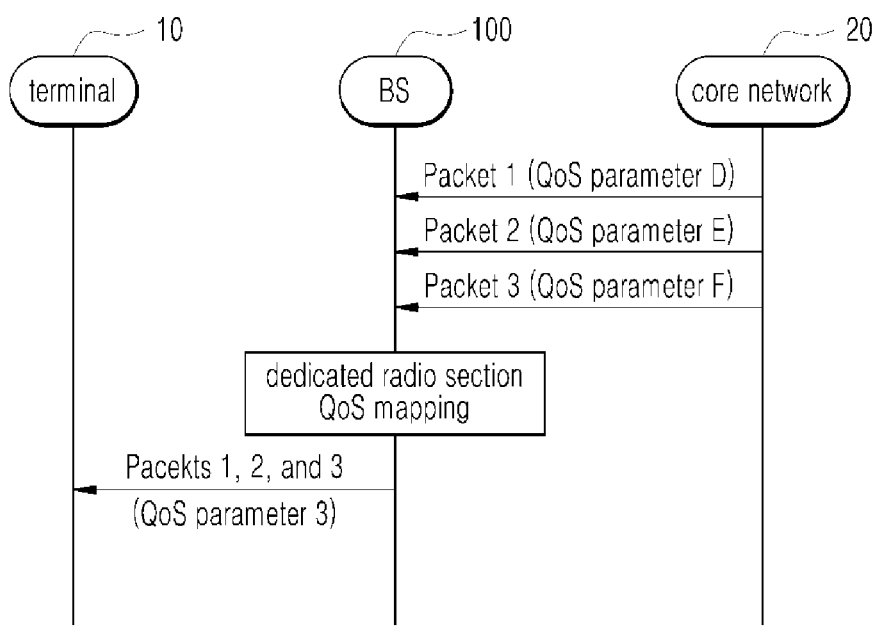

Referring to FIG. 7, for example, it is assumed that packets 1, 2, and 3 of service flows to which different QoS parameters D, E, and F are applied are received.

In this case, after identifying QoS parameters D, E, and F applied to service flows of the respective packets 1, 2, and 3, the BS 100 identifies dedicated radio section QoS parameters mapped to QoS parameters D, E, and F in the M:1 mapping table to perform dedicated radio section QoS mapping.

At this time, it is assumed that service flow of the packets 1, 2, and 3 is for IoT services specialized in wide coverage/low speed transmission (<1 kbps)/low power/small amount of data.

Further, it is assumed that QoS parameters D, E, and F applied to the IoT services are mapped to dedicated radio section QoS parameter 3 in the M:1 mapping table.

In this case, the BS 100 may apply dedicated radio section QoS parameter 3 in transmission of packets 1, 2, and 3 to the terminal 10, so as to transmit these packets 1, 2, and 3 at M:1 dedicated radio section QoS levels generated by converting QoS levels applied by the end of the core network 20 into dedicated radio section QoS levels.

Subsequently, the radio section QoS control method according to the third embodiment of the present disclosure will be described with reference to FIGS. 8 and 9.

Figure 8:
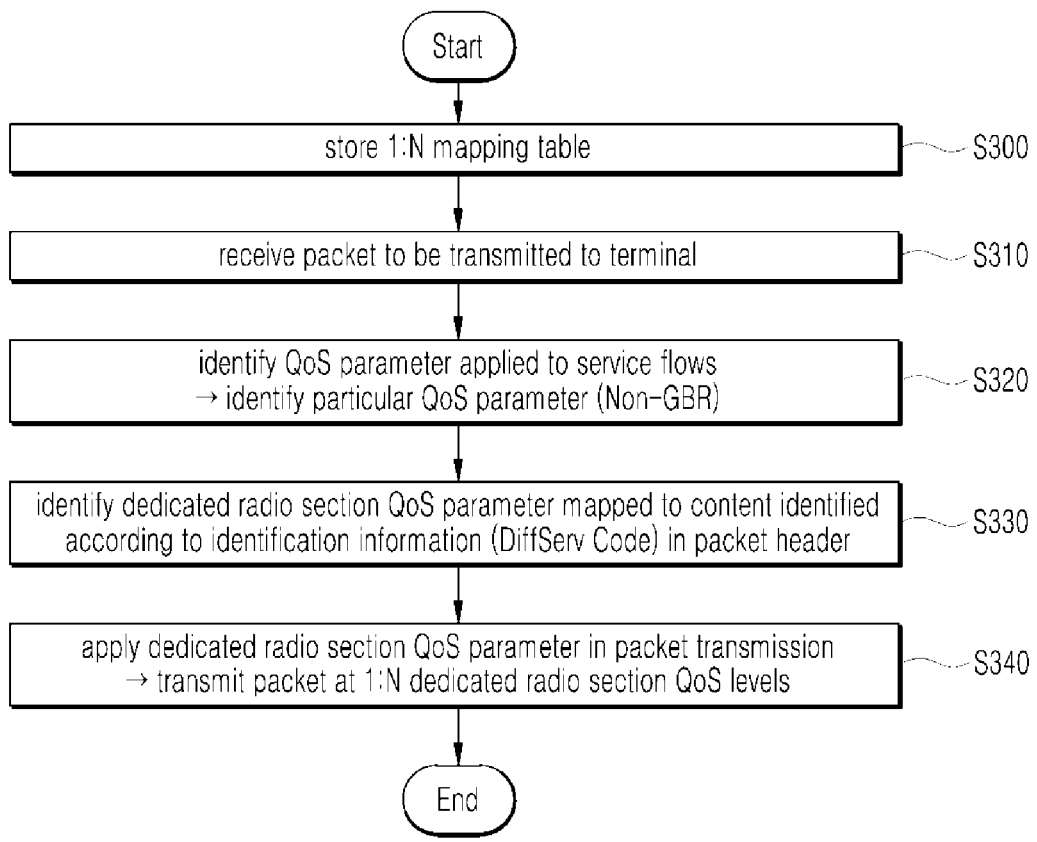
FIGS. 8 and 9 are control flowcharts illustrating a radio section QoS control method according to an embodiment of the present disclosure.

As illustrated in FIG. 8, in the radio section QoS control method of the BS 100 according to the present disclosure, a mapping table according to the third embodiment, that is, a 1:N mapping table of service flow:DRB is stored in S300.

In the radio section QoS control method of the BS 100, when a packet to be transmitted to the terminal 10 is received in S310, a QoS parameter applied to a service flow of the corresponding packet, that is, a QoS parameter applied by the core network 20 is identified in S320.

At this time, in the radio section QoS control method of the BS 100, when the QoS parameter identified in S320 is a particular QoS parameter of a non-GBR, a QoS (QoS requirement) of content may be identified on the basis of a Differentiated Services Code Point (DSCP) field for distinguishing a service quality type (DiffServ) in a header of this packet (for example, an IP packet header).

Further, in the radio section QoS control method of the BS 100, dedicated radio section QoS parameters mapped to the QoS (QoS requirement) of content identified on the basis of the DSCP field are identified in the 1:N mapping table in S330.

According to the radio section QoS control method of the BS 100, in this packet transmission to the terminal 10, the dedicated radio section QoS parameters (the dedicated radio section QoS parameters for each piece of content identified on the basis of the QoS (QoS requirement) of content in one service flow) identified in S330 are applied to transmit this packet to the terminal 10, and this packet is transmitted at dedicated radio section QoS levels (for each piece of content within the service flow) converted from the QoS level applied by the core network 20 in S340.

Figure 9:
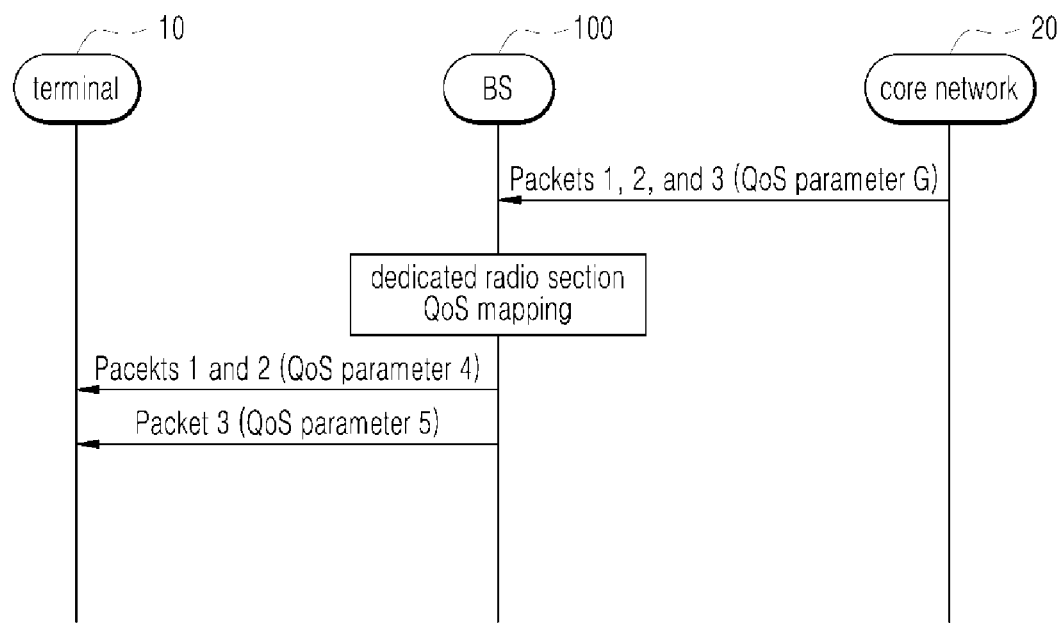

Referring to FIG. 9, for example, it may be assumed that packets 1, 2, and 3 of service flow to which a QoS parameter (non-GBR) is applied are received.

In this case, when QoS parameter G applied to service flow of packets 1, 2, and 3 is identified and QoS parameter G is a particular QoS parameter of a non-GBR, the BS 100 identifies a QoS (QoS requirement) of content on the basis of the DSCP field in a header of each packet 1, 2, or 3.

At this time, it is assumed that packets 1 and 2 are identified as the same QoS content and packet 3 is identified as different QoS content.

In this case, the BS 100 identifies the dedicated radio section QoS parameter mapped to content (QoS) of packets 1 and 2 and identifies the dedicated radio section QoS parameter mapped to content (QoS) of packet 3 in the 1:M mapping table, so as to perform dedicated radio section QoS mapping.

At this time, it is assumed that dedicated radio section QoS parameter 4 is mapped to content of packets 1 and 2 included in one service flow and dedicated radio section QoS parameter 5 is mapped to content of packet 3 in the 1:N mapping table.

In this case, the BS 100 may apply dedicated radio section QoS parameter 4 in transmission of packets 1 and 2 to the terminal 10 and apply dedicated radio section QoS parameter 5 in transmission of packet 3 to the terminal 10, so as to transmit these packets 1, 2, and 3 at 1:N radio section-dedicated QoS levels generated by converting the QoS levels applied by the core network 20 into the dedicated radio section QoS levels.

As described above, in the radio section QoS control method according to the present disclosure, it is possible to derive effects of applying a more differential QoS (service qualities) to communication services by implementing differential QoS control more precisely in the radio section without an increase in complexity and load compared to the conventional bearer based QoS control method.

The radio section QoS control method according to the present disclosure as described above may be implemented in the form of a program command which can be executed through various computer means and recorded in a computer-readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

What is claimed is:

1. A method of controlling quality of service (QoS) of a radio section, the method comprising:
   receiving, by a Base Station (BS) apparatus and from a core network, a mapping rule in which at least one dedicated radio section QoS parameter is mapped to at least one QoS parameter applied to service flows by the core network, the BS apparatus receiving the mapping rule before the BS receives a packet;

identifying, by the BS apparatus and based on receiving the packet, a specific QoS parameter, of the at least one QoS parameter, being applied to a specific service flow of the packet;

identifying, by the BS apparatus, a specific dedicated radio section QoS parameter, of the at least one dedicated radio section QoS parameter, mapped in the mapping rule to the specific QoS parameter being applied to the service flow of the packet; and transmitting, by the BS apparatus, the packet in the radio section by applying the identified specific dedicated radio section QoS parameter.

2. The method of claim 1, wherein a quantity of the at least one dedicated radio section QoS parameter is larger than a quantity of the at least one QoS parameter in the mapping rule.

3. The method of claim 1, wherein two or more different QoS parameters, of the at least one dedicated radio section QoS parameter, are mapped to one dedicated radio section QoS parameter, of the at least one QoS parameter, in the mapping rule.

4. The method of claim 3, wherein the two or more different QoS parameters are applied by the core network to a communication service for periodically transmitting an amount of data that is equal to or less than a particular size or an Internet of Things (IoT) service.

5. The method of claim 1, wherein, when a particular QoS parameter, of the at least one dedicated radio section QoS parameter, is applied to one service flow, the mapping rule maps a dedicated radio section QoS parameter to each QoS of content included in the one service flow.

6. The method of claim 5, wherein the particular QoS parameter is associated with a non-guaranteed bit rate (Non-GBR) service type which does not guarantee a bandwidth for the service flow.

7. The method of claim 5, wherein identifying the specific dedicated radio section QoS parameter mapped to the specific QoS parameter for the packet includes:

identifying the QoS of content based on a Differentiated Services Code Point (DSCP) field for indicating a service quality type (DiffServ) in a header of the packet when the particular QoS parameter is applied to the service flow, and identifying a corresponding dedicated radio section QoS parameter, of the at least one dedicated radio section QoS parameter, mapped to the identified QoS of content in the mapping rule.

8. The method of claim 1, further comprising:

receiving, by the BS apparatus, an uplink packet in the radio section based on applying the specific dedicated radio section QoS parameter; and forwarding, by the BS apparatus, the uplink packet through the core network based on the specific QoS parameter.

9. The method of claim 1, further comprising:

forwarding, by the BS apparatus, a Radio Resource Control (RRC) message to a terminal that is connected to the BS apparatus via the radio section, the RRC message including QoS control information identifying the mapping of the specific dedicated radio section QoS parameter to the specific QoS parameter.

10. The method of claim 9, wherein the RRC message identifies the at least one dedicated radio section QoS parameter mapped by the BS apparatus to the at least one QoS parameter applied to service flows by the core network.

11. The method of claim 1, further comprising:

receiving, by the BS apparatus, data associated with the mapping rule from the core network for converting the specific QoS parameter applied by the core network to the service flow to the specific dedicated radio section QoS parameter.

* * * * *